Oct. 27, 1953          W. F. KOCH          2,656,787
KEY-OPERATED TYPE POSITIONING DEVICE
Original Filed July 9, 1948          2 Sheets—Sheet 2
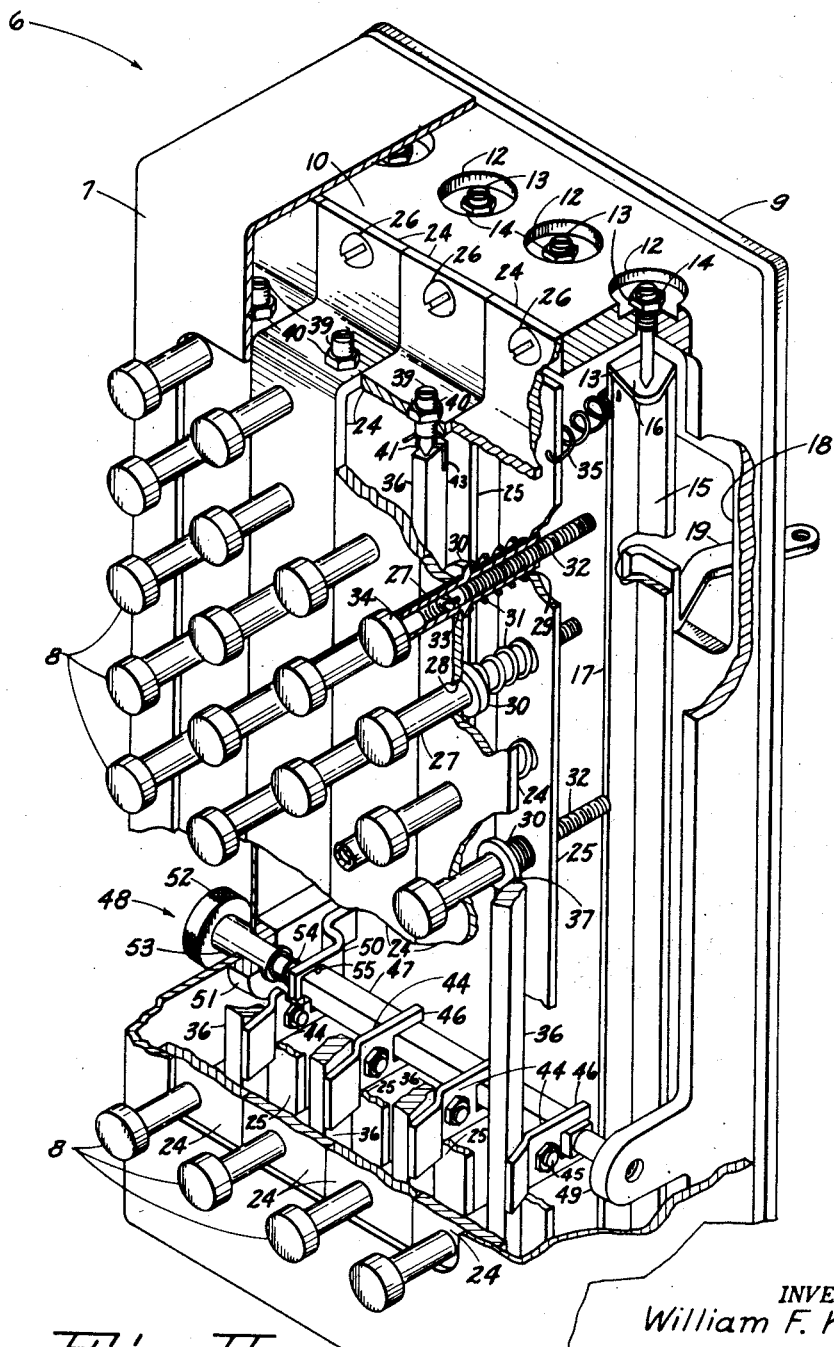
Fig. II
INVENTOR.
William F. Koch
BY
Marshall, Marshall & Leonard
ATTORNEYS Patented Oct. 27, 1953

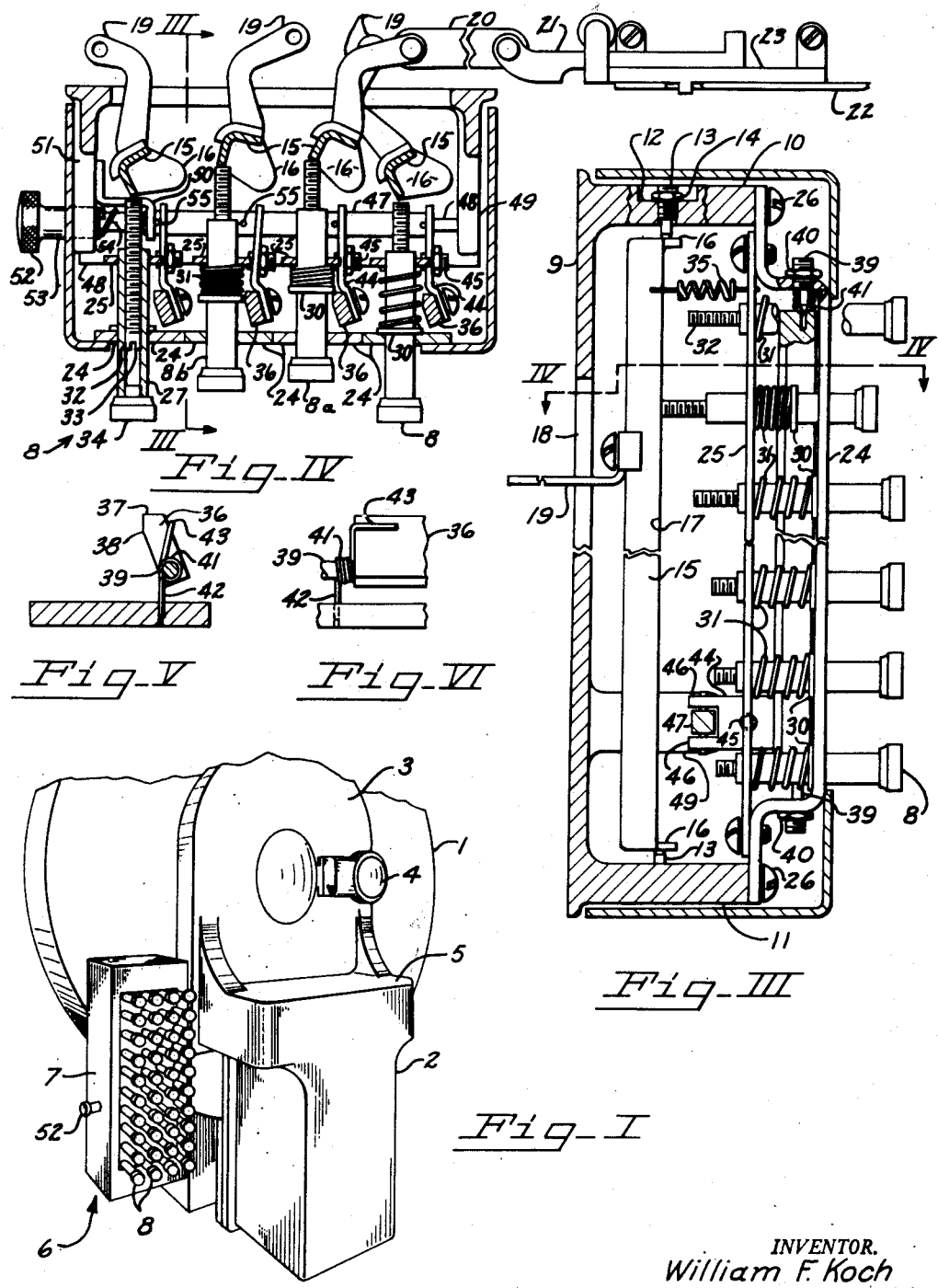

2,656,787

UNITED STATES PATENT OFFICE 2,656,787

KEY-OPERATED TYPE POSITIONING DEVICE

William F. Koch, Toledo, Ohio, assignor to Toledo Scale Company, Toledo, Ohio, a corporation of New Jersey Continuation of abandoned application Serial No. 37,812, July 9, 1948. This application October 2, 1951, Serial No. 249,330

5 Claims. (Cl. 101—93)

This invention relates to recording mechanism for weighing scales and in particular to key-operated mechanism for setting up type to print an identifying number on a recording slip along with the printed indication of weight.

This is a continuation of application Serial No. 37,812 filed July 9, 1948, now abandoned.

It is often desirable and in some cases necessary to record identifying symbols or numbers on the weight records in order that the respective weight records may be positively identified at later times. Mechanism for printing identifying symbols or numbers must be simple and positive in operation, must be easily manipulated even if the operator is wearing gloves and must be able to withstand continued use without loss of accuracy.

A weighing scale equipped with weight recording mechanism is illustrated in Patent No. 1,864,570, issued to Lawrence S. Williams on June 28, 1932. This patent shows a printing mechanism having an auxiliary type setting bar that cooperated with additional load counterbalancing mechanism so that printed record contains an indication of the load counterbalanced by the automatic counterbalancing mechanism as well as a record of the load that is counterbalanced by the supplementary load counterbalancing mechanism of the scale. This invention is the provision of improved mechanism for positioning type bearing strips that cooperate with the printing disk and printing mechanism of the device shown in the patent, the type bearing strips taking the place of the unit weight indicating strip of the patented structure.

The principal object of this invention is to provide improved mechanism for positioning type bearing strips in a weighing scale recorder.

Another object of the invention is to provide a key-operated mechanism that may be easily adjusted and that accurately positions type bearing strips in a printing mechanism.

A still further object of the invention is to provide a mechanism in which a plurality of keys selectively position a type bearing strip and in which the strip position corresponding to each of the keys is individually adjustable.

Another object of the invention is to provide a key-operated positioning device that is simple to manufacture and assemble and in which most of the parts are easily accessible for adjustment or repair.

Other objects and advantages are apparent from the following description of the improved key-operated positioning mechanism.

In a preferred embodiment of the invention a frame that is attachable to a weighing scale housing has journaled therein a plurality of bars one for each of the printing strips to be positioned. Each of the bars has an edge that is located eccentrically to the axis of rotation of the bar. A subframe is mounted adjacent such edge and a plurality of keys, each of which is slidable between two positions, are mounted in the subframe with the keys in line with the edge of the bar. Each of the keys carries an adjustable member which when the key is depressed contacts the edge of the bar and rotates the bar against the force of a spring that tends to hold the bar at one end of its rotative movement. Each of the keys is resiliently urged toward its non-contacting position and a latch cooperating with all the keys in one subframe serves to hold the most recently depressed key in its depressed or operative position. The adjustable portion of each of the keys is accessible from the operator's end of the key so that the adjustment may be made without disassembly of the completed mechanism.

The invention also contemplates a release mechanism that cooperates with the latch mechanism of each subframe so that all of the printing strips may be returned to their zero positions by a single operation of the release mechanism.

A preferred embodiment of the invention is illustrated in the accompanying drawings.

In the drawings:

Figure I is a fragmentary perspective view showing the improved key-operated positioning mechanism attached to the side of a weighing scale housing.

Figure II is a greatly enlarged, partially broken away perspective view of the improved positioning mechanism.

Figure III is a vertical section taken substantially along the line III—III of Figure IV.

Figure IV is a horizontal section taken substantially along the line IV—IV of Figure III.

Figures V and VI are fragmentary details of the resilient member which serves to hold the latch in operative position.

These specific figures and the accompanying description are intended merely to illustrate the invention but not to impose limitations on the claims.

In the Williams Patent No. 1,864,570, referred to above, a printing mechanism was shown as attached to the head mechanism of a weighing scale in such position that printed records could be obtained from type carried on a lightweight disk that is revolved by the weighing mechanism.

Referring now to Figure I, load counterbalancing mechanism of a weighing scale, not shown, is enclosed within a watchcase-shaped housing 1 and printing mechanism, substantially as disclosed in the patent, is enclosed within a housing 2 attached to the front of the dial housing 1. An upper portion 3 of the housing 2 is semicircular in form to enclose the disk upon which the weight indicia are formed and which indicia are visible through a magnifying glass 4 set in the face of the upper portion 3 of the housing 2. The printing operation takes place at the lowermost portion of the weight-operated dial, i. e. that portion which is just below the level of a shelf-like portion 5 of the housing 2. As usually manufactured, a slot is provided in the shelf-like portion 5 of the housing 2 through which slot tickets or paper strips may be inserted to receive the printed records.

A keyboard mechanism 6 is enclosed within a case 7 attached to the dial housing 1 adjacent the printing mechanism cover 2. The keyboard mechanism 6 comprises a plurality of keys 8 arranged in horizontal and vertical rows there being ten keys representative of the numbers from zero through nine in each vertical row and there being as many such vertical rows as may be required.

Referring now to Figure II, the keyboard assembly 6 includes a frame 9 that may be attached directly to the housing 1 of the weighing scale. The frame 9 has an upper flange 10 and a lower flange 11 (see also Figure III). The flanges 10 and 11 have stepped counterbores 12 the small diameter portions of which are tapped to receive cone pointed screws 13 that are held in adjusted position by lock nuts 14.

The cone pointed screws 13 serve as pivots for mounting vertically positioned bars 15. There is one of the bars 15 for each vertical row of keys 8. Each of the bars 15 is made from a piece of angle iron or similar structual shape and either a small plate 16 is attached to each end to receive the cone pointed screws 13 or one of the sides of the angle iron is bent over to provide the equivalent of the flat end piece 16. The cone pointed screws 13 engage the end pieces 16 of the bars 15 at a point that is remote from an edge 17 of the bar. The edge 17 is oriented substantially in line with that one of the vertical rows of the keys 8 with which it cooperates.

An opening 18 is cut in the back of the frame 9 and corresponds with a similar opening cut in the dial housing 1 so that arms 19 attached to the vertical bars 15 may be connected through links 20 to extensions 21 of type bars 22 (see Figure IV). The type bars 22 and extensions 21 are guided in a framework 23 attached to portions of the printing mechanism so that the type bars 22 are accurately guided with respect to the printing mechanism.

Each vertical row of keys 8 is carried in a subframe that consists of a front plate 24 and a back plate 25. The front plate 24 is given a Z-bend at each end and the back plate 25 is attached to the bent portions so that it lies parallel to but displaced from the front plate 24 throughout the greater portion of its length. The ends of the bent portions of the front plate 24 are drilled so that the subframe may be secured against the front edge of the flanges 10 and 11 by means of screws 26 or other suitable attaching means.

Each of the keys 8 consists of a sleeve 27 that is slidably mounted in aligned holes 28 and 29 of the front and back plates 24 and 25 respectively.

Each sleeve 27 carries a collar 30 rigidly attached thereto. A helical compression spring 31 encircles each sleeve 27 and is held compressed between the collar 30 and the back plate 25 of the subframe so as to urge the key toward its forward or undepressed position. Each of the sleeves 27 is internally threaded to receive a long headless screw 32 which contacts the edge 17 of the bar 15 when the key is depressed. Each of the screws 32 has a screw driver slot 33 which may be reached by removing a button 34 from the end of the sleeve 27. The buttons 34 serve as pads on the ends of the keys to protect the operator's fingers and also to carry indicia corresponding to the position of the strips 22 as determined by that particular one of the keys 8.

A small helical tension spring 35 connected between the back plate 25 of a subframe and the bar 15 continuously urges rotation of the bar 15 on the cone pointed screws 13 so as to bring the edge 17 of the bar 15 against the headless screws 32 of the keys 8. Thus the springs 35 tend to draw the printing strips 22 to their zero position or to their blank position, the latter if eleven positions are provided to avoid printing zeros at the left of the highest significant figure.

Referring now to Figure IV, each of the subframes carries a pivotally mounted latch bar 36 that has a beveled edge 37 (Figure V) adapted to catch under the collar 30 when a key is depressed and to hold the key in its depressed position as shown by the key 8a of Figure IV. The latch bars 36 each have a ridge 38 formed between two adjacent portions of the surface of the bar so that when a key is being depressed, such as the key 8b of Figure IV, the collar 30 engages the ridge 38 and pushes the latch bar 36 back far enough to disengage any previously depressed key before the key being pressed reaches its bottom or depressed position. The angle between the surfaces forming the ridge 38 is great enough so that regardless of the manufacturing variations in the collars 30 any previously depressed key will be positively released upon depression of any other key in the same vertical row.

The latch bars 36 are pivotally mounted on cone pointed screws 39 threaded through the horizontal portions of the Z-shaped bends of the front subframe plate 24. The cone pointed screws 39 are held in adjusted position by lock nuts 40 that are tightened against the adjacent horizontal surfaces of the front plate 24. Torsion springs 41 circumjacently mounted on the upper ones of the cone pointed screws 39 each have one end 42 anchored to the front piece 24 of the subframe and its other end 43 hooked over the edge of the corresponding latch bar 36. The springs 41 are tensioned to continuously urge the latch bars 36 into engagement with the collars 30 of the keys 8.

Each of the latch bars 36 near its lower end carries a horizontal arm 44 that, being provided with a set screw 45 which cooperates with an edge of the corresponding subframe back plate 25, serves to limit the movement of the latch bar 36 to an amount that is just sufficient to positively latch the collar 30 of a depressed key.

Each of the arms 44 is notched at its end to provide fingers 46 that straddle a square portion 47 of a horizontal axially slidable release bar 48. The release bar 48, the ends of which are of circular cross section, is carried at one end in a forwardly extending side arm 49 of the frame 9 and at its other end in a Z-shaped bracket 50 mounted from a second forwardly extending side arm 51 of the frame 9. The latch release bar 48 carries a knob 52 having a stem 53 sleeved over the end of the latch bar 48. A compression spring 54 sleeved onto the latch release bar 48 is held in compression between the stem 53 of the release knob and the adjacent surface of the Z-shaped bracket 50 so that the latch release bar is continuously urged toward the left as seen in Figures II and IV. Pins 55 are set in the square portion 47 of the latch release bar 48 so as to be just out of contact with the fingers 46 of the latch bar arms 44 when the latch bars are in their normal position. When the latch release knob 52 is pressed so as to axially slide the latch release bar 48 the pins 55 engage the fingers 46 to trip each of the latch bars 36 and thus release any depressed keys.

The travel of any of the keys 8 between its normal unlatched position and its depressed latched position exceeds by a small amount the travel of the edge 17 of the vertical bars 15 that is required to move the type bar strip 22 throughout its full range of travel. The adjusting members 32 of the keys are then set so that when a key is latched in its depressed position the corresponding type of the associated type bar 22 is accurately located in printing position. In the particular mechanism illustrated the maximum travel of a type bar from its normal position occurs in setting up the indicia corresponding to the uppermost keys in the bank of keys. The minimum travel of the type bar occurs when setting up the type corresponding to the bottom keys. Intermediate positions are obtained with the other keys.

In the event that eleven positions of the type bars 22 are desired so that when printing multi-digit numbers the zeros to the left of the first significant figure are omitted, the stroke of the keys 8, the length of the arms 19, the location of the pivots for the vertical bars 15 with respect to the edge 17, and the spacing of the type on the type bars 22 is correlated so that a blank space on the type bar 22 is set up in printing position when the edge 17 of the bar contacts the adjusting screw 32 of the uppermost key as shown in Figure III when such key is in its undepressed position. When that key is depressed and latched it drives the type bar 22 to the other end of its travel and sets the type at that end of the bar in printing position. The other nine positions are selected by means of the remaining keys, the adjusting members 32 of which are set according to the required travel of the type bar 22.

The provision of eleven positions does not materially increase the precision required in the construction of the parts because only ten of the positions, the ten at which there are printing type set up in printing position, need be accurately located and the eleventh position at which no printing is done may come where it will just so long as the adjacent type of the bar is outside the edge of the printing position. Thus the adjusting members 32 of the keys take care of the alignment in each of the ten printing positions for each of the type bars 22.

This key-operated mechanism is extremely simple to manufacture and service because of the ease with which it may be assembled or disassembled for adjustment. For example, each of the subframes carrying a vertical row of keys may be removed as a separate unit by merely taking out two screws 26 and unhooking the corresponding tension spring 35. The adjustment of the printing position of the type bars may be made without any disassembly other than slipping the cap 34 off the corresponding key and inserting a screw driver into the sleeve 27 to rotate the adjusting screw 32.

Various modifications in the details of construction may be made without departing from the spirit and scope of the invention.

Having described the invention, I claim:

1. In a type positioning mechanism of a weighing scale printing device, in combination, at least one bar having printing type spaced along a portion of its length, guide means for guiding the bar through a printing station, a drive link operatively connected to the bar for moving it longitudinally through said guide means, an elongated bar pivoted on an axis parallel to its length, a laterally extending arm on said elongated bar which arm is connected to said drive link, a plurality of keys arranged selectively to engage a portion of said elongated bar remote from its axis of rotation, a latch bar cooperating with the keys for holding the last operated key in operated position, said latch bar being pivotal on its axis, a beveled edge on said bar adjacent said keys, a collar fixed on each key adapted to be held in a latched position by the beveled edge when a key is depressed, a spring urging the latch bar toward the keys, spring means urging said keys toward their nondepressed positions, and a ridge on said latch bar adapted to be engaged by the collar of a key being depressed to pivot said latch bar on its axis and thereby release any previously latched key.

2. In a type positioning device for a printer, in combination, a plurality of type bars that are longitudinally positionable to present type in printing position, a frame, at least one bar mounted in said frame to pivot about an axis parallel to its length and offset from an edge thereof, each bar having an arm and linkage connected to the corresponding type bar, a removable subframe comprising parallel spaced apart plates mounted on the frame in parallel alignment with the edge of each of the bars, a series of tubular keys each slidably mounted in a pair of aligned holes in the plates, a collar on each key, the collar being located between the plates of the subframe, a screw threaded axially through each key and arranged to strike the edge of the cooperating bar, a spring engaging each key to urge it away from the bar, a spring urging the bar toward the keys, a pivotal latch bar mounted between the spaced apart plates and arranged to engage the collar of a depressed key to hold it in depressed position, and a longitudinal ridge on said latch bar which ridge is adapted to be engaged by the collar of a key being depressed to pivot said latch bar sufficiently to unlatch any previously latched key.

3. In a type positioning device for a printer, in combination, at least one type bar carrying type to be positioned, a frame, at least one bar mounted in said frame to pivot about an axis parallel to its length and offset from an edge thereof, an arm on said bar and linkage connecting the arm to the type bar, a removable subframe comprising parallel spaced apart plates mounted on the frame in parallel alignment with the edge of each of the pivoted bars, a series of tubular keys each slidably mounted in a pair of aligned holes in the plates, a collar on each key, a helical compression spring sleeved on each key and acting between the collar and that one of the plates nearer the pivoted bar, a spring urging the pivoted bar toward the keys, a screw threaded axially through each tubular key to engage the edge of the bar, a latch bar pivotally mounted between the plates of said subframe and arranged to engage the shoulder of a key to hold the key against the action of the springs, and a ridge on said latch bar which ridge is adapted to be engaged by the collar of a key being depressed to pivot said latch bar sufficiently to unlatch any previously latched key.

4. In a type positioning device for a weighing scale, in combination, a plurality of type carrying bars that are longitudinally positioned to present type in printing position, a frame, a plurality of parallelly mounted bars each of which is pivoted in the frame to turn about its longitudinal axis and each having an edge parallel to and spaced from its turning axis, an arm on each bar for connecting the bar to the type bar to be positioned thereby, a plurality of key assemblies each comprising a first and a second narrow plate that are attached to each other in parallel spaced apart relation and mounted as a unit in said frame in parallel alignment with the pivoted bars, the first plate of each of the key assemblies having a width equal to the spacing between the pivoted bars, a plurality of keys slidably mounted in the spaced apart plates in alignment with the edge of the associated bar, an adjustable member in each key that cooperates with the pivoted bar, springs urging each key toward its nondepressed position, a latch bar mounted on each key assembly intermediate the spaced apart plates and closely adjacent the keys, said latch bar being pivotal on its axis, means on each key that are engaged by said springs and that cooperate with the latch bar for holding the last operated key in operated position, and a longitudinal ridge on said latch bar adapted to be engaged by the means on each key engaged by the springs to pivot the latch bar on its axis.

5. In a type positioning device for a printer, in combination, at least one bar having printing type spaced along a portion of its length, guide means for guiding the bar through a printing station, a drive link operatively connected to the bar for moving it longitudinally through said guide means, an elongated bar pivoted on an axis parallel to its length, a laterally extending arm on said elongated bar which arm is connected to said drive link, a plurality of keys arranged selectively to engage a portion of said elongated bar remote from its axis of rotation, a latch bar cooperating with the keys for holding the last operated key in operated position, said bar being pivotal on its axis, a beveled edge on said bar adjacent said keys but spaced therefrom, a collar on each key adapted to be latched by the beveled edge when a key is depressed, a spring urging the latch bar toward the keys, a spring urging each key toward its non-depressed position, a ridge on said latch bar adapted to be engaged by the collars on said keys, engagement of said ridge by a collar of a key being depressed causing said latch bar to pivot away from the keys and release any previously latched key and latch the depressed key in operated position, an arm extending laterally from said latch bar, said arm being generally parallel with said keys, and a latch release bar slidable in a direction transverse to the arm, said release bar adapted to engage said arm on said latch bar to pivot said latch bar on its axis and thereby release any latched key to its non-depressed positions.

WILLIAM F. KOCH.

References Cited in the file of this patent

UNITED STATES PATENTS

| Number | Name | Date |
|---|---|---|
| 462,384 | Rumble | Nov. 3, 1891 |
| 476,319 | Severy | June 7, 1892 |
| 621,878 | West | Mar. 28, 1899 |
| 674,267 | Hubert | May 14, 1901 |
| 681,240 | Meyer | Aug. 27, 1901 |
| 923,981 | Mason | June 8, 1909 |
| 1,197,277 | Ellis | Sept. 5, 1916 |
| 1,245,500 | Pierce | Nov. 6, 1917 |
| 1,442,059 | Engstrom | Jan. 16, 1923 |
| 2,092,852 | Payne | Sept. 14, 1937 |
| 2,348,789 | Crosman | May 16, 1944 |